Patented Nov. 12, 1935

2,020,559

UNITED STATES PATENT OFFICE 2,020,559

RED GLAZE

Andrew Malinovszky, South Gate, and Albert L. Bennett, Burbank, Calif., assignors to Malinite Products, Inc., Los Angeles, Calif., a corporation of California No Drawing. Application April 10, 1933, Serial No. 665,442

8 Claims. (Cl. 91—72)

This invention pertains to compositions and methods of operation which render it possible to obtain brilliant, uniform and stable red glazes on ceramic products. More particularly, the invention relates to the preparation and utilization of selenium or mixtures of selenium and cadmium in glazes and to compositions and methods of operation whereby these stains may be caused to develop brilliant, acid-resisting, strong and durable glazes.

Heretofore selenium or selenium and cadmium mixtures have only been used in glass and in some enamels with indifferent results. In order to develop red tints in ceramic glazes, the use of a gold-containing stain or base has been resorted to, the colloidal suspension of gold imparting a ruby tint to the glaze. Pinks and rose-violet shades have been obtained heretofore with chromium and tin but these colors lacked the virility and brilliance of the reds contemplated by this invention. Furthermore, the development of red tints on ceramic bodies has usually necessitated the application of an over-glaze, this procedure adding materially to the cost and time spent in the production of the desired ware.

The present invention, on the other hand, utilizes selenium or selenium and cadmium compounds and insures the development of desired shades of red without segregation, the double application of glaze or the exercise of extreme care in temperatures, atmospheric conditions in the muffle or furnace, etc. The colors developed by the glazes of this invention include the yellow and orange shown on Plate 3, Colors Nos. 17, 15 and 13, and the red shown on Plate 2, Color No. 7 and on Plate 1, Colors 3i, 5, 3 and 1, of "Color Standards and Color Nomenclature", published by Robert Ridgeway, Washington, D. C., 1912.

It will be seen that these colors distinguish markedly from the pinks, maroons and rose-violet shades previously attainable only by the use of over-glazing or gold suspensions.

The invention also distinguishes from the prior art in that heretofore it was thought essential to have the base or frit substantially free from lead when selenium stains were employed. It has been discovered, however, that the proper manipulation of ingredients in the frit or base not only permits the use of lead but in addition the presence of lead stabilizes the glaze and adds to its brilliance, lack of segregation, and tensile and compressive strength.

It is an object of this invention, therefore, to disclose and provide glaze compositions, frits and stains which are capable of developing brilliant reds upon maturity upon a ceramic body.

Another object of the invention is to disclose and provide a base or frit capable of being used with selenium stains and of permitting said stains to develop brilliant red and orange colors.

A further object of the invention is to disclose and provide methods and conditions of operation whereby brilliant red glazes may be developed on ceramic bodies in a rapid and economical manner.

A still further object is to disclose and provide a method of preparing selenium stains in which the selenium is colloidally dispersed and stabilized so that proper maturing temperatures may be reached without adversely affecting the color of the finished glaze.

These and other objects, uses and advantages of the invention will become apparent to those skilled in the art from the following detailed description of preferred compositions, proportions and conditions.

In order to define the terms used herein, it may be said that in the making of ceramic articles, a base or frit is first prepared by compounding desired ingredients, smelting them or reducing them to vitrified form, and then grinding the fritted or vitrified mass to a state of fine division. This product is referred to herein as a frit or base. To this base is then added a stain, the stain imparting the color to the otherwise colorless base frit. This invention is particularly directed toward an operation which employs selenium or selenium and cadmium compounds in the stain. Selenium and selenium-cadmium stains are available on the market at the present time but the present invention also concerns itself with the preparation of a particularly desirable selenium stain which is distinguishable from the stains of the prior art. The mixture of stain and base frit is then applied to the ceramic bodies which it is desired to provide with a glazed surface. The mixture of frit (this mixture being also referred to as a glaze or glazing mixture) is then applied to the ceramic body either in finely divided dry form or in the form of a suspension or slurry. When the wet method of application is used, various floating mediums may be introduced. The present invention contemplates both dry and wet methods of application.

The glazing mixture is ordinarily applied to bisque bodies, that is, ceramic bodies which have been previously burned to maturity. According to this invention, however, the glazing mixture may be applied either to a high clay bisque which has been burned to a relatively high temperature, or it is applied to either the unburned or burned ceramic body of the character described in a copending application filed by Andrew Malinovszky, Serial No. 636,029.

The body bearing its glazing material is then subjected to the action of heat for the purpose of maturing the glaze, that is, reducing the glazing material to a liquid or semi-liquid, vitrified or glassy condition. When the glazing material has been applied to an unburned body, both the body and the glaze are matured in one operation. The process of this invention contemplates a burning operation which is extremely short or brief, the ceramic body together with its glazing material being subjected to the maximum or maturing temperature for a period of time ranging from 5 minutes to 1 hour only. Furthermore, such maximum or maturing temperature should be reached very quickly, that is, within a period of time of from 10 minutes to 3 to 4 hours of the time that the body is first exposed to the action of heat. The cooling time may vary considerably but rapid cooling does not deleteriously affect the preferred glaze of this invention.

It has been discovered that whenever selenium or selenium and cadmium compounds are used as stains in a glaze, the glazing material, including the frit or base, must be carefully compounded, certain elements kept out of the frit and other elements introduced into the frit in particular proportions. It has been discovered that alumina, tin and sulphur are injurious to the glazes. Of these three, the most destructive is tin, the presence of even small quantities of this material making it impossible to obtain a clear red glaze, the color changing into a milky gray, fading out completely or the glaze develops a black, splotchy appearance.

Sulphur does not destroy the red coloration but it is the cause of scumming and imparts to the glaze a dull surface. Alumina has a very destructive effect on the color, killing the red shade and producing grayish-white to white colors. For this reason it has been definitely demonstrated that the alumina content of the frit or base should be kept below 9% or 10% as these quantities destroy the red coloration. Preferably, not more than about 5% of alumina should be present and if possible the alumina content is completely eliminated, or at least maintained below about 4%.

Calcium and magnesium oxides tend to produce segregation of color, dullness, brownish discoloration, and matted surface and metallic surface effects. When present in small quantities, however, these ingredients are not detrimental. Ordinarily from 2% to 5% of the fused frit may consist of calcium oxide and/or magnesium oxide but the total of these two elements should not exceed 10%.

The silica content of the frit does not appear to influence the color of the selenium glaze. Preferably, however, the silica content of the frit lies from about 46% to 51% as frits of this silica content give rise to glazes having good acid resistance.

The presence of boron appears essential for the development of true colors with selenium and cadmium. The proportion of boron present in terms of $B_2O_3$ may range from about 7.5% to 30% of the total. Bright red selenium colors will be developed along the entire range but the acid resistance of the resulting glaze is markedly affected by the higher proportions of boron.

Glazes containing more than about 15% of boron have generally been found to have little resistance to acids or even to lemon juice or vinegar. For good acid-resisting glazes, therefore, from about 8% to 14% of boron may be present in the frit. Frits containing from 10% to 14% of boron have the added advantage of minimizing the deleterious effect of relatively high percentages of sodium, zinc, barium, calcium and magnesium. If a sufficient quantity of boron is present, otherwise injurious quantities of these other fluxes may be used without deleteriously affecting the red color of the finished glaze.

The allowable percentage of sodium oxide varies with the content of boron. When from 8% to 14% of boron is present, the sodium oxide may vary from about 5% to 12%. Better red colors are obtained in the lower sodium range, that is, 5% to 7% or 8%, although a sufficient quantity of sodium needs be present to obtain a sufficiently low fusing or maturing temperature for the glaze. The higher amounts of sodium, say from 9% to 12% or more, have been found to cause a certain amount of recrystallization or segregation in certain compositions. The material which crystallizes out of the glaze is a white, water-soluble compound which gives rise to a white discoloration in the glaze.

Although selenium reds of highly desirable brilliance can be obtained by the use of frits high in boron (about 30%), the resulting glazes are not acid-resisting. It has been discovered, however, that the addition of lead (as lead oxide or carbonate but expressed hereinafter as PbO) not only improves the red colors but also improves the quality of the glaze itself. The presence of 12% of boron alone in a frit will not develop the desired selenium red but the addition of lead to the frit causes the development of the desired coloration. A frit containing from 8% to 14% of boron may contain up to about 25% of lead as PbO. In contents of over 25%, the lead exercises a destructive effect on the red color and produces metallic segregations; with certain compositions, the higher contents of lead oxide cause bad boiling of the glaze.

The proportion of lead which may be added safely to the frit appears to vary directly with the boron content. The higher the boron content, the more lead can be added. The higher the lead content, however, the more yellow the red colors become. It appears that the best glazes as well as the best red colors are obtained when from about 1 to about 2 parts of PbO are present to each part of $B_2O_3$. When higher proportions of lead to boron are used, there is a tendency for the glaze to segregate and for the development of a metallic sheen or crystallization. The preferred frits, therefore, contain from about 7% to 15% of $B_2O_3$ and from about 10% to 22% of PbO.

The introduction of fluorine into the base has been found to be beneficial to the development of the desired red colors although it exerts a deleterious effect on acid resistance. For this reason, not over about 3% of $F_2$ should be used. It is to be understood, however, the fluorine is not an essential ingredient of the base or frit inasmuch as excellent red glazes have been made without its presence. Titanium and zirconium oxides do not appear to materially influence the color although they dull the texture somewhat. Antimony is very destructive to the development of brilliant reds.

The various critical factors mentioned hereinabove may be illustrated in definite frit proportions and analyses. A frit having the following analysis, for example, will develop a good red color when used with selenium stains:

| | Per cent |
|---|---|
| $SiO_2$ | 46.47 |
| $Al_2O_3$ | 4.27 |
| CaO | 5.25 |
| MgO | 0.11 |
| $CaF_2$ | 7.68 |
| $K_2O$ | 2.14 |
| $Na_2O$ | 12.72 |
| $B_2O_3$ | 21.32 |

Although a frit having the above analysis will develop a good red color, the resulting glaze is not acid-resisting because of the high content of boron and the lack of accompanying lead. The fluorine content is also high. Furthermore, the color tends to be a little unstable and is quite sensitive, being effective only within a short firing range and tending to a black discoloration.

The following three batches represent highly desirable frits capable of being used on ceramic bodies for the development of the brilliant selenium colors of this invention. The raw batches may be compounded as follows:

| | A | B | C |
|---|---|---|---|
| Feldspar | 18 | 18 | |
| Silica | 30 | 30 | 40 |
| Calcium carbonate | 2 | 2 | 6 |
| Magnesium carbonate | | | 4 |
| Borax | 19 | 12 | 15 |
| Boric acid | 6 | 6 | 10 |
| Sodium carbonate | 5 | 8 | 10 |
| Sodium nitrate | | 3 | 3 |
| Calcium fluoride | 4 | 3 | |
| Lead oxide | 16 | 18 | 12 |

The above proportions are by weight. The ingredients in each batch are thoroughly mixed and then melted, cooled and ground to give a base having the following analyses:

| | A | B | C |
|---|---|---|---|
| $SiO_2$ | 49.07 | 49.17 | 51.44 |
| $Al_2O_3$ | 3.88 | 3.88 | |
| CaO | 4.73 | 1.42 | 4.32 |
| MgO | 0.10 | 0.10 | 2.47 |
| $B_2O_3$ | 12.01 | 9.48 | 14.34 |
| $Na_2O$ | 7.45 | 10.07 | 12.00 |
| $K_2O$ | 1.94 | 1.95 | |
| $F_2$ | 2.25 | 3.48 | |
| PbO | 18.57 | 20.90 | 15.43 |

Attention is called to the fact that in the preferred frits A, B and C given hereinabove as illustrations, lead and boron are jointly present in the proportions stated hereinbefore to be most satisfactory. Selenium stains may be used in these frits for the development of brilliant and clear red and scarlet colors on ceramic bodies and furthermore such brilliant reds and scarlets will be developed at maturing temperatures of from about 1650° F. to 1750° F., the time of exposure to these temperatures varying only from about 5 to 45 minutes.

The specific glazes given hereinabove have been used on ceramic bodies of the character described in the co-pending application Serial No. 636,029, the glaze being applied to the unburned body and then passed through a tunnel kiln in which the temperature of 1500° F. was reached in 1½ hours, a top temperature of 1692° F. reached in 1 hour and 50 minutes, the ware leaving the 1500° F. zone in a little over 2 hours and being cooled down to 400° F. at the expiration of 4 hours from the time the ware entered the kiln. Cone 09 was down in this burning operation. Slightly longer times at lower temperatures are satisfactory. It is to be observed that the glaze is not critically affected by the atmospheric conditions in the kiln or furnace and for this reason it is not necessary to closely regulate the operation nor insure the presence of either oxidizing or reducing conditions.

It is to be understood the the quantities of the various components may be varied within the limits stated hereinbefore so as to develop a frit having the desired compressive and tensile strength as well as coefficient of expansion and maturing temperature. It is essential, however, for the successful development of the brilliant colors on ceramic ware that the firing operation be rapid as a long burning operation will turn the above glazes black and finally a milky gray. These selenium glazes, therefore, made in accordance with this invention, can be successfully applied to ceramic bodies not only when the ingredients forming a part of the frit come within the limits defined but also that such frits and glazes be burned under time and temperature conditions which differ widely from those used heretofore.

Whereas days have been heretofore spent in glost burning of ceramic ware, the present operation contemplates the use of hours or minutes only. As a result, not only are unusually brilliant novel colors obtained but furthermore time and cost are decimated and the capacity of a given plant or apparatus enormously increased.

The application of the glazing materials of this invention in unburned clay bodies is not recommended although they may be applied to well burned clay bisque. Instead of employing a continuous burning operation as described hereinabove, the ceramic bodies carrying the glazing material may be plunged into a heated zone such as a furnace, maintained therein for a short period of time, say 5 to 30 minutes, and immediately withdrawn into a cooling zone. When such plunging is used, the heated zone is preferably preheated to a temperature higher than that which would be utilized in maturing the same glaze in a tunnel kiln. For example, where temperatures of about 1700° F. are used in a tunnel kiln, a temperature of about 1850° F. should exist in the furnace or maturing zone before the bodies are plunged thereinto. Obviously, ordinary ceramic bodies will not withstand such rapid temperature changes but the bodies described in the copending application Serial No. 636,029 are eminently suited for this purpose.

As has been stated hereinbefore, there are selenium and cadmium stains on the market which may be used with the frits described hereinabove. Better and more uniform results are obtained, however, by preparing the stains in the following manner:

Cadmium, sulfide or carbonate, metallic selenium, zinc oxide or barium carbonate, sulfur and borax (or other flux such as a small proportion of the frit) are intimately mixed and placed into an air-tight crucible made of dense material such as porcelain. These ingredients in the desired proportions are then calcined in this crucible without access of extraneous air, to a temperature of 900° C. to 1000° C., or above the volatilizing temperature of selenium. The calcination is therefore carried out at a superatmospheric pressure and substantially all of the vapors and gases liberated during the operation are retained in the crucible. Excess pressure can.

of course, be released during the calcination whenever necessary because of structural characteristics of the apparatus.

During this calcination, the volatilized selenium is throughly and intimately absorbed and combined with the other fluxed ingredients and the calcined stain is retained in the crucible until the temperature thereof has dropped to at least 600° C. or below the volatilization point of selenium. After finally cooling, the stain is ground and mixed with the base or frit in such proportion that the glazing mixture applied to the ware carries from about 1½% to 5% of selenium.

The cadmium content may vary from 0% to about 3.5% in terms of cadmium sulfide.

In the manufacture of the stain, the following proportions have been found to be particularly suitable:

| | Parts |
|---|---|
| Metallic selenium | 5 to 35 |
| Cadmium carbonate or cadmium sulfate | 25 to 75 |
| Sulfur | 10 to 30 |
| Borax | 1 to 4 |

These ingredients are then thoroughly mixed and then compounded with a molecular mixture of silica and boric acid in equal molecular ratios, the mixture of silica and boric acid constituting from about 40% to 60% of the total then added to the calcining crucible.

The mixture of cadmium salts, selenium and borax can also be calcined or fritted with a low fusion alkali-boro-zinc-silicate glaze.

Compositions and processes have heretofore been devised for the use of selenium or selenium and cadmium in producing red or orange-colored opaque enamels on metals such as sheet iron, but this invention relates to the compositions and processes described above which are capable of producing a transparent brilliant red or orange glaze on a body composed of ceramic materials.

It will be seen by those skilled in the art that a process of producing ceramic bodies provided with brilliant glazes ranging from clear deep reds, through scarlets into the yellow-orange, has been disclosed. This result is attained most successfully as described herein by preparing selenium stains in the manner stated, compounding the frit with boron and lead and in the substantial absence of alumina and tin, and then burning ceramic bodies containing silica and alkaline earths in major proportions (of the character described in the co-pending application Serial No. 636,029) to a maturing temperature quickly, that is, so as to cause the glazing material to reach the maturing temperature in from 10 minutes to not more than about 4 hours.

Those skilled in the art will appreciate that numerous changes, modifications and adaptations of this invention may be made without departing from the novel teachings of this invention. All such changes and modifications as come within the scope of the appended claims are embraced thereby.

We claim:

1. A process of producing ceramic bodies provided with brilliant glazes of the character described, comprising the steps of: applying a glazing material containing a selenium stain and a frit to a ceramic body, said frit containing from about 7.5% to 15% $B_2O_3$, about 10% to 22% PbO, not more than about 5% $Al_2O_3$, and practically being free from tin, the balance being composed principally of silica; then subjecting the ceramic body and glazing material carried thereby to a heat sufficient to cause the glazing material to reach a maturing temperature in from 10 minutes to not more than about 4 hours; and finally cooling the glazed body.

2. A process of producing ceramic bodies provided with brilliant glazes of the character described, comprising the steps of: applying a glazing material containing a selenium stain and a frit to a ceramic body containing silica and alkaline earths in major proportions, said frit containing from about 7.5% to 15% $B_2O_3$, about 10% to 22% PbO, not more than about 5% $Al_2O_3$, and practically being free from tin; then subjecting the ceramic body and glazing material carried thereby to a heat sufficient to cause the glazing material to reach a maturing temperature in from 10 minutes to not more than about 4 hours; and finally cooling the glazed body.

3. A process of producing ceramic bodies provided with brilliant glazes of the character described, comprising the steps of: applying a glazing material containing a selenium stain and a frit to a ceramic body, said frit containing from about 7.5% to 15% $B_2O_3$, about 10% to 22% PbO, not more than about 5% $Al_2O_3$, and practically being free from tin, the balance being composed principally of silica; then subjecting the ceramic body and glazing material carried thereby to a heat sufficient to cause the glazing material to reach a maturing temperature in from 10 minutes to not more than about 4 hours; continuing the application of maturing heat for a period of time not exceeding about 1 hour; and finally cooling the glazed body.

4. A process of producing ceramic bodies provided with brilliant glazes of the character described, comprising the steps of: applying a glazing material containing a selenium stain and a frit to a ceramic body containing silica and alkaline earths in major proportions, said body, in dehydrated form containing, in molecular ratio, 4 to 14 parts of $SiO_2$, less than 3 parts $Al_2O_3$ and 0.6 to 4 parts CaO and MgO to 1 part of alkali as $Na_2O$; said frit containing from about 7.5% to 15% $B_2O_3$, about 10% to 22% PbO, not more than about 5% $Al_2O_3$, and practically being free from tin; then subjecting the ceramic body and glazing material carried thereby to a heat sufficient to cause the glazing material to reach a maturing temperature in from 10 minutes to not more than about 4 hours; and finally cooling the glazed body.

5. A process of producing ceramic bodies provided with brilliant glazes of the character described, comprising the steps of: applying a glazing material containing a selenium stain and a frit to a ceramic body containing silica and alkaline earths in major proportions, said body, in dehydrated form containing, in molecular ratio, 4 to 14 parts of $SiO_2$, less than 3 parts $Al_2O_3$ and 0.6 to 4 parts CaO and MgO to 1 part of alkali as $Na_2O$; said frit containing from about 7.5% to 15% $B_2O_3$, about 10% to 22% PbO, not more than about 5% $Al_2O_3$, and practically being free from tin; then subjecting the ceramic body and glazing material carried thereby to a heat sufficient to cause the glazing material to reach a maturing temperature in from 10 minutes to not more than about 4 hours; continuing the application of maturing heat for a period of time not exceeding about 1 hour; and finally cooling the glazed body.

6. A process of producing ceramic bodies provided with brilliant glazes of the character described, comprising the steps of: applying a glazing material containing a selenium stain and a frit to a ceramic body, said frit containing from about 7.5% to 30% of $B_2O_3$, about 7.5% to 25% of PbO, about 5% to 12% of $Na_2O$, not more than 10% of $Al_2O_3$, not more than 3% of $F_2$, and not more than 5% of either MgO or CaO, and practically being free from the tin, the balance being composed principally of silica; then subjecting the ceramic body to a heat sufficient to cause the glazing material to reach a maturing temperature in from 10 minutes to not more than about 4 hours; an finally cooling the glazed body.

7. A process of producing ceramic bodies provided with brilliant glazes of the character described, comprising the steps of: applying a glazing material containing a selenium stain and a frit to a ceramic body; said stain containing selenium in colloidally dispersed form; said frit containing from about 7.5% to 30% of $B_2O_3$, about 7.5% to 25% of PbO, about 5 to 12% of $Na_2O$, not more than 10% of $Al_2O_3$, not more than 3% of $F_2$, and not more than 5% of either MgO or CaO, and practically being free from tin; then subjecting the ceramic body to a heat sufficient to cause the glazing material to reach a maturing temperature in from 10 minutes to not more than about 4 hours; and finally cooling the glazed body.

8. A process of producing ceramic bodies provided with brilliant glazes of the character described, comprising the steps of: applying a glazing material containing a selenium stain and a frit to a ceramic body, said stain containing selenium in colloidally dispersed form, said frit containing from about 7.5% to 15% $B_2O_3$, about 10% to 22% PbO, not more than about 5% $Al_2O_3$, and practically being free from tin, the balance being composed principally of silica; then subjecting the ceramic body and glazing material carried thereby to a heat sufficient to cause the glazing material to reach a maturing temperature in from 10 minutes to not more than about 4 hours; and finally cooling the glazed body.

ANDREW MALINOVSZKY.
ALBERT L. BENNETT.